Patented Apr. 1, 1941

2,236,528

UNITED STATES PATENT OFFICE 2,236,528

DERIVATIVES OF ALCOHOL AMINES

Albert K. Epstein and Morris Katzman, Chicago, Ill., assignors to The Emulsol Corporation, Chicago, Ill., a corporation of Illinois

No Drawing. Application June 22, 1939,
Serial No. 280,526

17 Claims. (Cl. 260—401)

Our invention relates to a new class of chemical substances, and more in particular to a new class of chemical substances having capillary active properties and particularly adapted for use as detergents, wetting, penetrating, emulsifying, lathering, flotation and anti-spattering agents, and for frothing purposes.

The principal object of the present invention is the provision of a new class of chemical substances capable of satisfactory use in connection with the problems and fields hereinabove and hereinafter discussed.

Another object is the provision of a new class of chemical substances which are in general of relatively simple structure and can be cheaply made in commercial quantities.

Another object is the provision of a new class of chemical substances having improved wetting and detergent characteristics.

Other objects and features of the invention will be apparent from a consideration of the following detailed description.

The substances of the invention are, in general, derivatives of alcohol amines wherein at least one amino hydrogen is replaced by a carboxylic acyl radical with at least four and preferably from eight to eighteen carbon atoms, and wherein at least one hydroxyl hydrogen of the alcohol amine is replaced by a carboxylic acyl radical of a sulpho-poly-carboxylic acid, particularly of aliphatic character and of lower molecular weight. In all cases the compounds contain at least one unesterified sulphonic acid group although, in certain circumstances, there may be more than one unesterified sulphonic acid group in the poly-carboxylic acid radical or there may be sulphonic acid groups that are esterified and other sulphonic acid groups that are not esterified. The poly-carboxylic acid radical with the unesterified sulphonic acid group is, as indicated, preferably of lower molecular weight and, for best results, should be aliphatic in character and contain not more than eight carbons.

Considering the compounds from another aspect, at least most of them are substituted amides, the molecule containing an amide linkage having preferably a relatively high molecular weight lipophile group, and at least one hydrophile sulphonic acid radical. The presence in the same molecule of the amide and the sulphonic groups, as a result of the specific reactants employed, appears to impart unusually satisfactory properties to the final products. Moreover, the amide linkage appears to bring about an acceleration of the reaction for introducing the sulphonic group or groups into the molecule. A more complete understanding of what may comprise the lipophile groups and the particular character of the sulpho-polycarboxylic acid groups will be had as the detailed description progresses.

Illustrative examples of compounds having the probable formulae and falling within the scope of the invention are as follows:

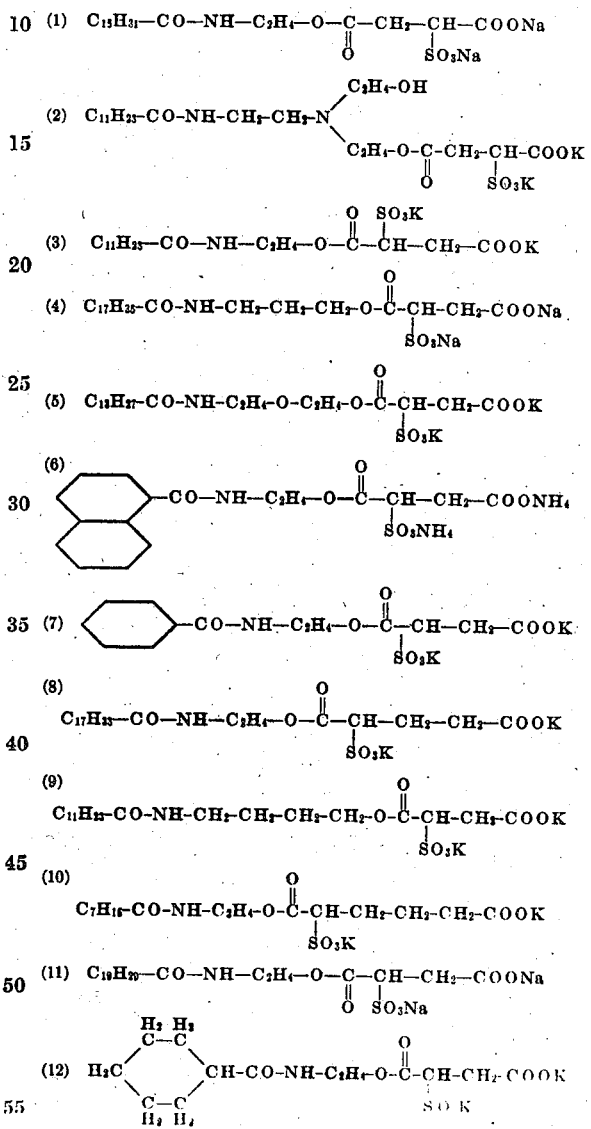

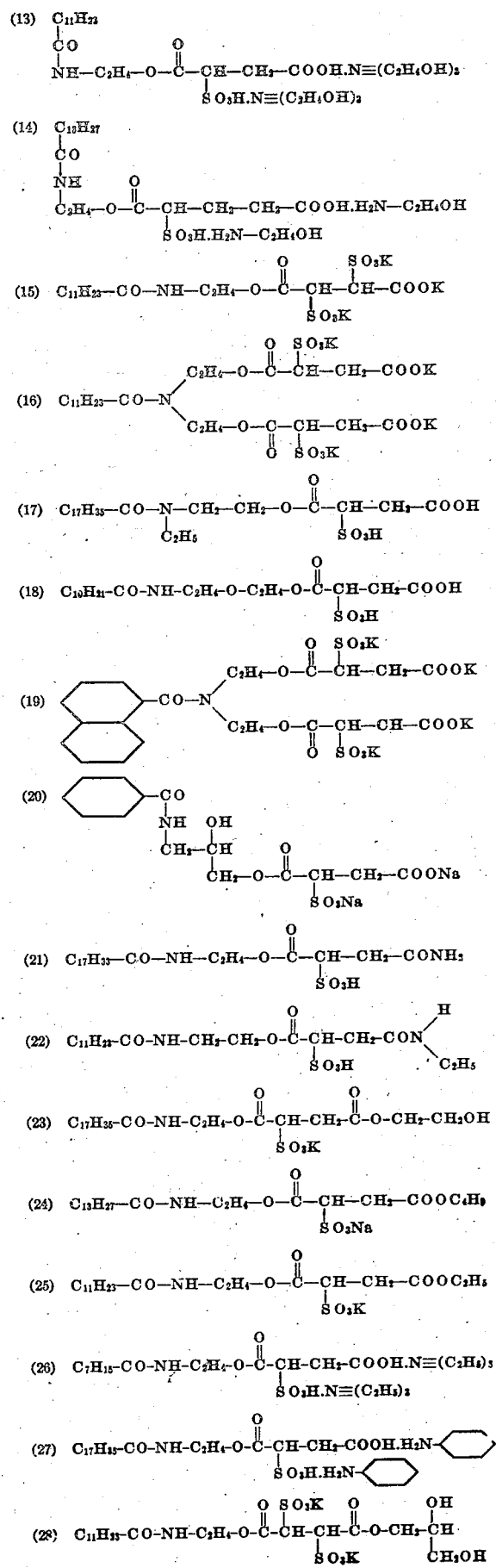
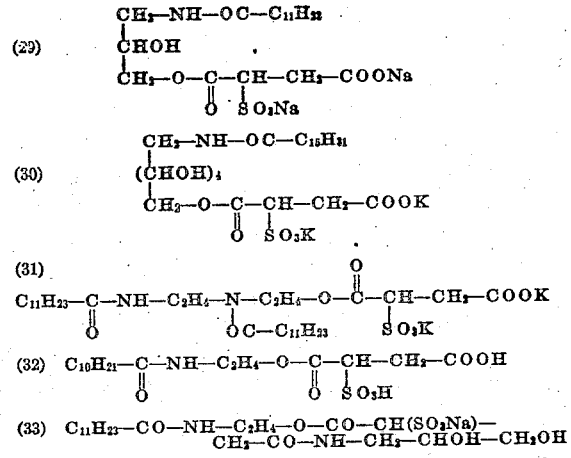

(13) through (33): chemical formulas

(33) $C_{11}H_{23}$—CO—NH—$C_2H_4$—O—CO—CH($SO_3$Na)—$CH_2$—CO—NH—$CH_2$—CHOH—$CH_2$OH

While the above examples represent single substances, it will be understood that, in practice, it may be, in general, more advantageous to employ mixtures of any two or more thereof with or without diluents of reaction masses containing desired quantities of the active products.

Many different types of compounds may be selected as lipophile groups which are to be reacted with the alcohol amines, principally compounds having lipophile radicals of relatively high molecular weight. For example, the following materials may be utilized as sources of lipophile groups: Straight chain and branched chain carboxylic, aliphatic, and fatty acids, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oil, whale oil, shark oil, partially or completely hydrogenated animal and vegetable oils such as those mentioned; oxidized and/or polymerized higher fatty acids or higher fatty acids derived from oxidized and/or polymerized triglyceride oils; hydroxy and alpha-hydroxy higher aliphatic and fatty acids such as i-hydroxy stearic acid, dihydroxy stearic acid, alpha-hydroxy stearic acid, alpha-hydroxy palmitic acid, alpha-hydroxy lauric acid, alpha-hydroxy coconut oil mixed fatty acids, and the like; other substituted fatty acids such as

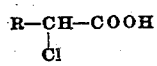

R—CH—COOH
        |
        Cl where R is a higher molecular weight hydrocarbon radical; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid, and abietic acid; aromatic acids such as phthalic acid, benzoic acid, naphthoic acid, pyridine carboxylic acids, hydroxy aromatic acids such as salicylic acid, hydroxy benzoic and naphthoic acids, and the like; and substitution and addition derivatives such as amino, halogen, hydroxy, sulphate, sulphonic, phosphate and the like substitution and addition derivatives of the aforementioned carboxylic substances. It will be understood that mixtures of any two or more of said acids may be employed.

The primary and secondary or non-tertiary alcohol- or alkylol-amines which provide the linkage between the lipophile group and the sulpho-poly-carboxylic group may be selected from a large class and include, for example, mono-ethanolamine, diethanolamine, mono-propanolamine, di-propanolamine, mono-ethyl ethanolamine, mono-butyl ethanolamine, mono-butanolamine, mono-iso-butanolamine, di-butanolamine, mono-pentanolamine, di-pentanolamine, mono-hexanolamine, di-hexanolamine, mono-decylolamine, mono-laurylolamine, mono-hexadecylolamine, mono-octodecylolamine, hydroxy poly-amines such as mono-hydroxy ethylene diamine, mono- and poly-hydroxy derivatives of diethylene triamine and triethylene tetra-amine and the like, mono- and poly-amines of sugars and sugar alcohols such as dextrose, sucrose, sorbitol, mannitol and dulcitol, and amines of polyhydric alcohols in general such as glycerol mono- and di-amine, and the like as well as cyclic hydroxy amines including, for example, p-amino phenol,

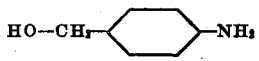

and the like.

From a study of the compounds which are listed hereinabove, those skilled in the art will understand that many different expedients may be employed for forming the compounds in so far as the dominant lipophile group and the sulpho-poly-carboxylic acid group are concerned. The skilled chemist will understand in general the most approved practices in securing the results. Numerous methods are also available for the introduction of the sulphonic acid group. In the case of aromatic sulphonic acids, of course, standard sulphonation procedures employed for producing aromatic sulphonic acids may be used, and, if desired, the lipophile group may be introduced subsequently.

In the case particularly of aliphatic sulphonic acids, a reactive halogen may be caused to react with an alkali sulphite such as sodium sulphite, potassium sulphite, ammonium sulphite or lithium sulphite or some other sulphite in aqueous solution, if desired.

Another method is to introduce a sulph-hydryl or disulphide or some other suitable sulphur group and then oxidize to the sulphonic acid with nitric acid or a permanganate or some other oxidizing agent.

Another method comprises reacting a carboxylic acid amide of an hydroxy amine, such as monoethanolamine, with a halogeno-poly-carboxylic acid such as monochlorsuccinic acid or dichlorsuccinic acid, or with a halogeno-poly-carboxylic acid halide such as mono-chlorsuccinyl chloride or dichlor-succinyl bromide and then converting the latter into the sulphonic acid derivative by reaction with an alkali sulphite. Other halogeno-poly-carboxylic acids or derivatives thereof which may be utilized are those derived from mono- and di-brom glutaric acid and the corresponding glutaryl bromides, and the corresponding halogen derivatives of adipic acid, sebacic acid and the like.

A further method which may be employed with particular advantage in certain cases is initially to provide an intermediate product, for example, monoethanolamine in which the hydroxy hydrogen is replaced by the carboxylic acyl radical of a sulpho-poly-carboxylic acid, and then react the same with a higher molecular weight acyl halide or a lower molecular weight, say, ethyl, ester of a higher aliphatic acid or the like to replace amine hydrogen with a higher molecular weight carboxylic acyl group.

Other alternative methods which offer certain advantages in some instances comprise (1) reacting an amide of a higher fatty acid or the like, such as lauric acid amide, with a halogen hydrin, such as ethylene bromhydrin or glycerol chlorhydrin, whereby halogen hydride is split out, and then reacting the resulting compound with maleic anhydride or the like followed by treatment with a salt of sulphurous acid such as sodium or potassium bisulphite; (2) reacting a halogen hydrin, such as ethylene bromhydrin, with maleic anhydride or the like to form the halogen-containing ester, introducing the sulphonic group with an alkali sulphite or bisulphite or the like, and then reacting with a higher fatty acid amide to split out hydrobromic acid; (3) reacting a higher fatty acid amide with an alkylene oxide, such as ethylene oxide to form one or a plurality of oxy-ethylene chains, and then reacting the resulting compound with maleic anhydride or the like followed by treatment with an alkali sulphite or bisulphite.

Still another method comprises initially preparing the sulpho-polycarboxylic acids, for example, by reaction of an unsaturated dicarboxylic acid or a salt thereof with an alkali or like sulphite or bisulphite, or by sulphonation of a saturated or unsaturated dicarboxylic acid, and reacting the resulting sulpho-polycarboxylic acid with the carboxylic acid amide, for example, the lauric acid amide of mono-ethanolamine.

A still further method comprises reacting a higher molecular weight aliphatic carboxylic acid amide of an hydroxy amine, such as monoethanolamine, with an unsaturated polycarboxylic acid such as maleic acid, and more particularly an anhydride of such an acid, such as maleic anhydride, and then introducing a sulphonic group by reaction with salts of sulphurous acids such as sulphites and bisulphites, the reaction being conducted at such pH ranges as to obtain the desired speed of reaction. In general, alkali sulphites and bisulphites such as sodium or potassium sulphites and bisulphite or meta bisulphite are satisfactory. Alternatively, after the reaction with the maleic anhydride or the like, halogen may be introduced at the double bond either directly or, for example, by means of hypochlorous acid, and the resulting compound treated with an alkali sulphite such as sodium, potassium, ammonium, or lithium sulphite.

The following examples are illustrative of the preparation of compounds falling within the scope of the invention. It will be understood, of course, that said examples are given only by way of illustration and are not to be considered in any way limitative of the true scope of the invention. Thus, for example, other methods may be employed, the proportions of reacting ingredients and times and temperatures of reaction may be varied, and supplementary processes of purification may be resorted to wherever found desirable or convenient. These and other variations and modifications will be evident to those skilled in the art in the light of the guiding principles disclosed herein.

*Example A*

(1) 25 grams of the coconut oil mixed higher fatty acid amides of monoethanolamine (consisting largely of the lauric acid amide of monoethanolamine) and 11 grams of maleic anhydride were mixed together and heated to 100 degrees C. for a few minutes with stirring.

(2) 10 grams of the product resulting from part (1) hereof were mixed with 10 grams of potassium meta-bi-sulphite dissolved in 40 cc. of water (50 degrees C.) and the mixture was warmed to 60 degrees C.–70 degrees C., with stirring, for a few minutes. The mass became clear and homogeneous. It was a viscous liquid, soluble in water, and had excellent wetting and foaming properties. The reaction product comprises essentially a compound having the following probable formula:

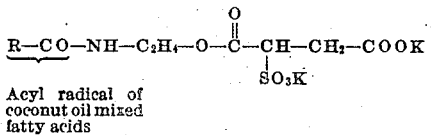
Acyl radical of coconut oil mixed fatty acids

Example B 216 grams of the maleic acid ester of the coconut oil mixed fatty acid amides of monoethanolamine, 150 grams of sodium sulphite and 400 cc. of water were heated and stirred at a temperature from 60 degrees C. to 65 degrees C. for a period of about 10 minutes. The reaction mass was a paste which contained a substantial proportion of a compound having the following probable formula:

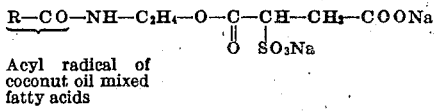
Acyl radical of coconut oil mixed fatty acids

In order to make an effective hair shampoo from this composition, 690 cc. of water were added thereto, the product was cooled to 20 degrees C. and 55 cc. of a 30% solution of hydrogen peroxide were added in order to remove the excess sodium sulphite. The product was neutralized to a pH of 6.8 by adding 12.5 cc. of a 20% solution of sodium hydroxide. The final product was a clear solution which had excellent foaming and detergent properties. If desired, the product may be substantially diluted with water.

Example C 76.8 grams of the caproic acid amide of monoethanolamine and 20 grams of maleic anhydride were slowly heated for 10 minutes to 100 degrees C. and then heated to 230 degrees C. for about one hour, under vacuum, whereby a compound having the following probable formula was produced:

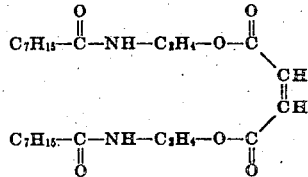

10 grams of this product were then heated with 20 grams of sodium bisulphite and 40 cc. of water for between 10 and 15 hours at a temperature of about 90 degrees C. until the mixture became water soluble. The resulting product, which was in paste form, had excellent foaming properties and comprised a substantial proportion of a compound having the following probable formula:

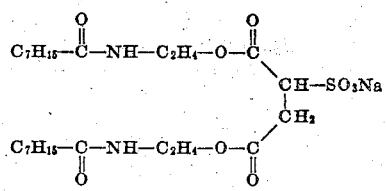

Example D (1) 1051 grams of monostearin and 200 grams of monoethanolamine were mixed together and heated from 174 degrees C. to 250 degrees C. for a period of about 2 hours. The reaction product thus obtained was washed twice, in each instance with 20 pounds of boiling water to remove excess or unreacted monoethanolamine and the glycerine which was set free in the reaction. In the first washing step, 45 cc. of concentrated hydrochloric acid were added to the wash water in order to neutralize the excess monoethanolamine and to facilitate the removal thereof by washing. In each instance, about 1 pound of common salt was added to the wash water in order to aid in salting out the compound. The resulting amide was dried at 150 degrees C.–160 degrees C. in an oven.

(2) 36 grams of the dried amide resulting from part (1) hereof were mixed with 11 grams of maleic anhydride and the mixture was heated up to 140 degrees C., with stirring, for a period of about 10 minutes.

(3) 11 grams of the reaction mass resulting from part (2) herein, 20 cc. of water, and 7.5 grams of sodium sulphite were heated at 70 degrees C.–80 degrees C. for about 10 minutes, with stirring. The resulting product comprised a white paste, soluble in water and having good foaming and surface tension reducing properties. It contained a substantial proportion of a compound having the following probable formula:

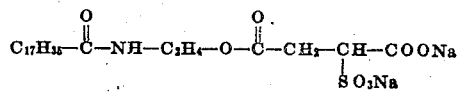

Example E (1) 25 grams of diethanolamine were dissolved in 25 cc. of water and then 23 grams of lauroyl chloride were added dropwise, with stirring, the mass being cooled so that the temperature did not rise above about 30 degrees C. To the resulting reaction product, 1000 cc. of water were added and the mass was heated to 80 degrees C., common salt being added to the point of saturation. An oily layer formed on the top of the reaction mixture and was removed and then dissolved in ether. Anhydrous sodium sulphate was then added to the ether solution, the mass was filtered, and the ether evaporated. The residue contained predominantly the lauric acid amide of diethanolamine.

(2) 9.9 grams of lauric acid amide of diethanolamine, obtained as described in part (1) hereinabove, and 3.6 grams of maleic anhydride were heated to 80 degrees C., with stirring, after which the temperature spontaneously rose to 90 degrees C. The reaction mixture was then heated to 100 degrees C. and kept at such temperature for between 5 and 10 minutes.

(3) 12 grams of the reaction product from part (2) hereinabove, 20 cc. of water and 10 grams of sodium bisulphite were heated at a temperature of 55 degrees C.–60 degrees C. for about 10 minutes, with stirring, the resulting reaction product had good foaming and wetting properties.

(4) In order to eliminate the excess sulphite present in the reaction product, 6 grams of a 30% hydrogen peroxide solution were added dropwise, with stirring, the mass being maintained in an ice bath in order to prevent the temperature rising above about 35 degrees C. The reaction product was then neutralized with 8 cc. of a 20% solution of sodium hydroxide. The final product, which had good foaming and wetting properties, contained a substantial proportion of a compound or a mixture of compounds having the following probable formulae:

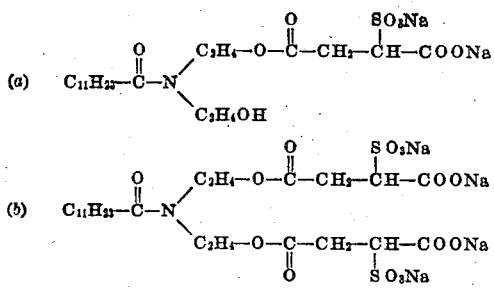

Example F (a) To 76 grams of a 23.6% aqueous solution of 1,3 di-amino propanol-2, 87.2 grams of lauroyl chloride were added dropwise, the temperature being maintained between 25 degrees C. and 35 degrees C. by means of a cold water bath. Simultaneously with the dropwise addition of the lauroyl chloride a 16% aqueous solution of sodium hydroxide was added dropwise in order to neutralize the hydrochloric acid which formed in the reaction. During the reaction, 400 cc. of water were added intermittently in order to maintain the precipitate which formed in dispersible condition. When the reaction was substantially complete, 15 cc. of a 20% aqueous solution of sodium hydroxide were added in order to neutralize the mass to phenolphthalein.

The reaction product was then mixed with water up to a volume of 1500 cc. and 15 cc. of concentrated hydrochloric acid were added to render the solution just acid to methyl red. The solution was then cooled to room temperature and filtered. The precipitate was washed with 1500 cc. of cold water and the mass was again filtered and dried. The residue was then washed with 1500 cc. of petroleum ether and was filtered and dried, the dried product having the probable formula:

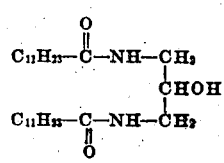

(b) 13 grams of the dried amide, produced as described in part (a) hereof, and 6 grams of maleic anhydride were heated, with stirring, up to 150 degrees C. and held for 5 minutes at such temperature. On cooling, the product was a brown, viscous syrupy liquid. 10 grams of this product, 10 grams of sodium sulphite and 20 cc. of water were heated up to 60 degrees C.–70 degrees C. and maintained at such temperature, with stirring, for approximately 10 minutes. The resulting reaction mass was a heavy paste, soluble in water, foamed well, and contained a substantial proportion of a compound having the formula:

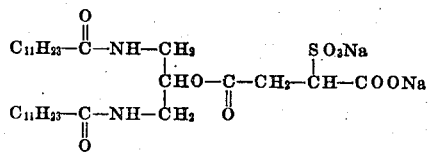

Example G (a) 17 grams of aconitic acid and 10 grams of acetyl chloride were refluxed together for about an hour or until the mixture became a clear solution. The reaction product was freed from excess acetyl chloride and acetic acid which is formed during the reaction by subjecting the same to a vacuum while maintaining it on a hot water bath. The residue obtained comprised essentially aconitic anhydride.

(b) To the aconitic anhydride obtained in part (a) hereinabove, 12 grams of the amide of coconut oil mixed fatty acids with monoethanolamine were added and the mass heated to 110 degrees C., with stirring. The temperature spontaneously rose to 120 degrees C. and the mass was maintained at such temperature for about 10 minutes. The resulting product was a reddish viscous syrup.

(c) 15 grams of the reaction product produced in part (b) hereinabove, 14 grams of sodium sulphite and 40 cc. of water were heated to between 60 degrees C. and 65 degrees C. and maintained at such temperature for about 5 minutes, the reaction mass being constantly stirred. The final product was a relatively clear liquid, had good foaming properties and contained a substantial proportion of a compound having the following probable formula:

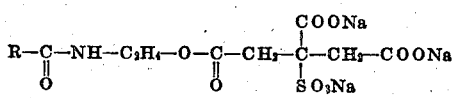

In certain instances, as indicated, by way of illustration, in Examples (17), (18) and (32), a free carboxyl group may be present in the compounds. Such compounds may be further reacted to esterify or amidify the free carboxyl group to convert the same into the groups —CONH$_2$, —CONHR, and —COOR where R is preferably lower molecular weight alkyl or cycloalkyl such as ethyl, butyl, cyclohexyl and the like, which may contain substituent groups such as halogen, hydroxy, amino, cyanogen, and the like. In the case of the ester linkage, that is, the —COOR group, the radical R may be that of a polyhydric alcohol or polyhydroxy substance such as glycerol, glycols and polyglycols such as ethylene glycol, propylene glycol, butylene glycol, diethylene glycol, polyglycerols, and the like. Such derivatives have particularly desirable properties in the technical and industrial arts. The usual amidification and esterification procedures can readily be adapted by the skilled chemist to the preparation of such derivatives.

Those substances which are freely soluble in water may be recovered from their solutions in the customary manner by concentration and crystallization. As stated hereinabove, as the mass of the lipophile radical increases, solubility decreases and affinity for water is manifested by the dispersibility in water. From these dispersions, the substances may be readily recovered by "salting out" with suitable soluble electrolytes. Common salt is very satisfactory for this purpose in most cases. When salted out of an aqueous dispersion at temperatures ranging from 60 to 95 degrees C., the substances are obtained in the form of a paste with a water content ranging from approximately 25 to 75%. The more hydrophilic the substance, the greater the water content, and, of course, the salt is present in the water of the paste in approximately the same concentration in which it existed in the dispersion from which the paste was salted out.

Many of the compounds of our invention may be represented by the general formula

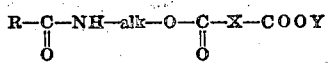

wherein

is an acyl radical containing at least six and preferably from twelve to eighteen carbon atoms, alk is alkylene or (alkylene-O-alkylene)$_t$, $t$ being one, two, three or more, X is a carbon-hydrogen residue containing a sulphonic group, and Y is a cation.

In many instances, the compounds are best and most accurately described as corresponding to reaction products of sulpho-poly-carboxylic acids with amides of hydroxy alcohol amines with higher molecular weight carboxylic, particularly fatty, acids. Not infrequently the compounds comprise mixtures.

At least many of the compounds of the present invention have utility in various arts in which interface modifying agents are employed. Many of them are resistant to precipitation by calcium and magnesium salts and are compatible with acid and alkali media. They may be utilized in washing and laundering and in the textile and related industries wherein they function for softening, wetting, detergent, emulsifying, penetrating, dispersing, frothing and foaming purposes. The textiles, various treatments of which in the presence of the agents of the present invention is rendered effective, comprise natural products such as cotton, wool, linen and the like as well as the artificially produced fibres (and fabrics), such as rayon, cellulose acetate, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of our invention may be placed is for the treatment of paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, as pickling inhibitors in metal cleaning baths, in shoe polishes, in rubber compositions, for breaking or demulsifying petroleum emulsions such as those of the water-in-oil type which are encountered in oilfield operations, and for various other purposes which will readily occur to those versed in the art in the light of our disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alcohol or alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium, sulpho-glutarate, lauryl monoethanolamine sulpho-acetate, and the like; sulphuric and sulphonic derivatives of condensation products of alkylolamines and higher fatty acids; Turkey-red oils; compounds of the type of isopropyl naphthalene sodium sulphonate, and other classes of wetting agents.

It will be understood that the products may be employed in the form of impure reaction mixtures containing substantial proportions of the effective interface modifying agent or agents or, if desired, for any particular purposes, purification procedures may be employed to produce pure or substantially pure products. Those versed in the art are familiar with the types of purification methods which may be employed with advantage herein, particularly in the light of the disclosures made hereinabove.

In the event that the compounds of the invention are made by reacting the halogen derivatives with alkali sulphites or other soluble sulphites as well as thio-sulphates, the corresponding alkali sulphonic acid derivative will be produced. The term alkali is employed to include the ammonium radical (NH4). When prepared by other methods so that the compounds contain the sulphonic acid group (—SO3H), the hydrogen thereof may be replaced by other cations such as calcium, magnesium, aluminum, zinc, amines, alkylolamines such as mono-, di- and triethanolamine and mixtures thereof, other organic nitrogenous bases such as pyridine and piperidine, nicotine, tertiary amines, quaternary ammonium bases such as tetra-methyl ammonium hydroxide, etc., as described, for example, in Patent No. 2,166,144. It will be understood that by the term "cation," as used throughout the specification and claims, is meant hydrogen and such other elements as are mentioned herein, and, in general, atoms or radicals which are regarded as bearing a positive charge or capable of replacing acidic hydrogen.

The sulpho-polycarboxylic acids whose derivatives may be made in accordance with the invention herein include, by way of illustration and among others, sulphofumaric acid, sulphomaleic acid, sulphosuccinic acids, sulpho-malonic acid, sulphoglutaric acid, sulphoadipic acid, sulphopimelic acid, sulpho-azelaic acid, sulpho-citraconic acid, sulpho-mesaconic acid, sulphosebacic acid, sulphosuberic acid, sulpho-itaconic acid, sulpho-glutaconic acid, sulpho-mucic acid, sulpho-o-carboxy cinnanic acid, sulphoaconitic acid, and the like. The sulphodicarboxylic acid derivatives are particularly preferred which contain not more than eight carbon atoms. The sulpho-polycarboxylic acid radicals may contain substituent groups such as halogen, cyanogen, amino, hydroxy and the like but, in general, the best results are obtained when the sulpho-poly-carboxylic acid radical is otherwise unsubstituted.

Unless otherwise indicated, the term "higher," wherever employed in the claims, will be understood to mean at least eight carbon atoms and, concomitantly, the term "lower" will mean less than eight carbon atoms.

Whenever the term sulpho-polycarboxylic acid radical, sulpho-dicarboxylic acid radical, sulphosuccinic acid radical, or the like expression is employed in the claims, it will be understood to cover the compounds irrespective of whether the hydrogen of the sulphonic or carboxylic acid radical is present as such or replaced by another cation.

What we claim as new and desire to protect by Letters Patent of the United States is:

1. An alcohol amine in which amine hydrogen is replaced by an aliphatic carboxylic acyl radical containing at least four carbon atoms, and in which hydroxyl hydrogen is replaced by an aliphatic sulpho-poly-carboxylic acid radical.

2. An alkylolamine in which one hydroxyl hydrogen is substituted by an aliphatic sulpho-dicarboxylic acid acyl radical containing from four to eight carbon atoms, and in which one amine hydrogen is substituted by a straight chain aliphatic carboxylic acid acyl radical containing from twelve to eighteen carbon atoms.

3. An alkylolamine in which one hydroxyl hydrogen is substituted by a sulpho-succinic acid acyl radical and in which one amine hydrogen is substituted by a fatty acid acyl radical containing from twelve to eighteen carbon atoms.

4. An alkylolamine in which hydroxyl hydrogen is substituted by a sulpho-succinic acid acyl radical, and in which amine hydrogen is substituted by a straight chain aliphatic carboxylic acid acyl radical containing from twelve to eighteen carbon atoms.

5. An alcohol amine in which amine hydrogen is replaced by an aliphatic carboxylic acyl radical containing from twelve to eighteen carbon atoms, and in which hydroxyl hydrogen is replaced by an aliphatic sulpho-dicarboxylic acid acyl radical containing not more than eight carbon atoms.

6. Monoethanolamine in which one amine hydrogen is replaced by an aliphatic carboxylic acyl radical containing from twelve to eighteen carbon atoms, and in which the hydroxyl hydrogen is replaced by an aliphatic sulpho-dicarboxylic acid radical containing not more than eight carbon atoms.

7. Monoethanolamine in which one amine hydrogen is substituted by coconut oil mixed fatty acid acyl radicals and wherein hydroxyl hydrogen is replaced by a sulpho-succinic acid acyl radical.

8. Monoethanolamine in which one amine hydrogen is substituted by a straight chain fatty acid acyl radical containing at least four carbon atoms and in which one hydroxyl hydrogen is replaced by an aliphatic sulpho-dicarboxylic acid acyl radical containing not more than eight carbon atoms.

9. A mono-hydroxy alkylolamine in which hydroxyl hydrogen is substituted by an aliphatic sulpho-dicarboxylic acid acyl radical containing not more than eight carbon atoms, and in which one amine hydrogen is substituted by a carboxylic acyl radical containing at least eight carbon atoms.

10. Chemical compounds having the formula

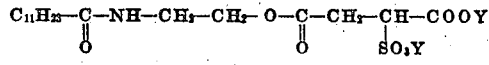

wherein Y is a cation selected from the group consisting of alkali metals, ammonia, and ethanolamines.

11. The process which comprises reacting a fatty acid amide of an hydroxy amine, the fatty acid radical containing from twelve to eighteen carbon atoms, by means of a member selected from the group consisting of unsaturated aliphatic dicarboxylic acids and their anhydrides, and then reacting the resulting compound with a salt of sulphurous acid.

12. The process which comprises reacting a member of the group consisting of maleic acid, maleic acid anhydride, and fumaric acid, with a carboxylic acid amide of an hydroxy aliphatic amine, the carboxylic radical containing a chain of at least four carbon atoms, and then reacting the resulting ester with an alkali bisulphite.

13. The process which comprises reacting a higher fatty acid amide of monoethanolamine, the fatty acid radical of which contains from twelve to eighteen carbon atoms, with maleic anhydride, and then reacting the resulting compound with an alkali bisulphite.

14. The process which comprises reacting an hydroxy amine to introduce a carboxylic acid acyl radical containing at least four carbon atoms in place of amine hydrogen of the hydroxy amine, and an aliphatic sulpho-poly-carboxylic acid acyl radical in place of hydroxyl hydrogen of the hydroxy amine.

15. The process which comprises reacting a carboxylic acid amide of an alcohol amine, the carboxylic acid radical containing at least four carbon atoms, by means of a member selected from the group consisting of unsaturated aliphatic poly-carboxylic acids and their anhydrides, and then reacting the resulting compound with a salt of sulphurous acid.

16. The process which comprises reacting monoethanolamine to introduce therein, in place of one amine hydrogen, a fatty acid acyl radical containing from twelve to eighteen carbon atoms, and, in place of hydroxy hydrogen of the monoethanolamine, an aliphatic sulpho-dicarboxylic acid acyl radical containing not more than eight carbon atoms.

17. An alcohol amine in which amine hydrogen is replaced by an aliphatic carboxylic acyl radical containing at least eight carbon atoms and in which hydroxyl hydrogen is replaced by a sulpho-poly-carboxylic acid radical.

ALBERT K. EPSTEIN.
MORRIS KATZMAN.